(12) United States Patent
Kury (10) Patent No.: US 10,036,366 B1
(45) Date of Patent: Jul. 31, 2018

(54) BUOYANT ENERGY DEVICES

(71) Applicant: Charles Kury, Marston Mills, MA (US)

(72) Inventor: Charles Kury, Marston Mills, MA (US)

(*) Notice: Subject to any disclaimer, the term of this patent is extended or adjusted under 35 U.S.C. 154(b) by 0 days.

(21) Appl. No.: 15/062,554

(22) Filed: Mar. 7, 2016

(51) Int. Cl.
*F01D 17/00* (2006.01)
*F03B 17/02* (2006.01)
*F42B 19/06* (2006.01)
*F42B 12/20* (2006.01)

(52) U.S. Cl.
CPC ............ *F03B 17/02* (2013.01); *F42B 12/204* (2013.01); *F42B 19/06* (2013.01)

(58) Field of Classification Search
USPC .............. 114/20.2; 415/26, 30, 52.1; 60/326
See application file for complete search history.

(56) References Cited

U.S. PATENT DOCUMENTS

| | | | | |
|---|---|---|---|---|
| 5,753,978 A * | 5/1998 | Lee | .......... | F03B 17/02 290/10 |
| 5,899,066 A * | 5/1999 | Brassea-Flores | ....... | F03B 17/02 60/496 |
| 6,447,243 B1 * | 9/2002 | Kittle | ...................... | F03B 17/02 415/92 |
| 8,151,565 B2 * | 4/2012 | Carrion-Torres | ....... | F03B 17/02 290/42 |
| 8,197,201 B2 * | 6/2012 | Mayrand | ................ | C02F 3/082 415/202 |

\* cited by examiner

*Primary Examiner* — J. Woodrow Eldred
(74) *Attorney, Agent, or Firm* — Michael I. Kroll; Edwin D. Schindler (57) ABSTRACT

A buoyant energy device is disclosed. Differing specific gravities between various materials are used to drive turbine blades to create energy by cycling the materials through a turbine activation area. The materials include water, oils, gasses (lighter than air and ambient air), or various other materials as circumstances may require. The device produces electricity that may be stored or used immediately. It is contemplated that the device could be used to power a missile, a torpedo, static mines, or the like.

11 Claims, 11 Drawing Sheets

BUOYANT ENERGY DEVICES

BACKGROUND OF THE INVENTION

Field of the Invention

The present invention relates generally to electrical devices and, more specifically, to electrical devices enabled with a buoyant energy engine that provides for the electrical needs of the devices.

Description of the Prior Art

There are other engines which provide for generating electricity. While these engines may be suitable for the purposes for which they were designed, they would not be as suitable for the purposes of the present invention as heretofore described.

It is thus desirable to provide a buoyancy energy engine using solids and/or liquids and/or gases as motive force for turning turbine blades to produce electrical energy.

It is further desirable to provide a buoyancy device that can be used as a guided explosive device.

SUMMARY OF THE PRESENT INVENTION

A primary object of the present invention is to provide an engine for generating electricity that can be incorporated into electrically driven devices.

Another object of the present invention is to provide a buoyant energy engine that uses solids, liquids or gases as motive force powering a turbine that will then generate electricity, Yet another object of the present invention is to provide a buoyant energy engine having housing incorporating a motive force derived from buoyancy or gravity that is directed upon the blades of an electricity generating turbine.

Still yet another object of the present invention is to provide a buoyant energy engine wherein said housing provides a structure that includes a pair of column-like compartments with one containing a liquid and a buoyant device energy sphere movable through its buoyancy from the bottom of the compartment to the top where it is moved to the second air filled compartment having a turbine impeller therein where it is released moving by gravity to the impeller causing rotation of the impeller then moving to the base of the column where then it is moved backed to the liquid filled compartment to repeat the cycle.

An additional object of the present invention is to provide a buoyant energy engine wherein said housing provides a structure including a buoyant device balloon having a valve, a turbine impeller, a pump and a gas source that moves the gas into and out of the buoyant device causing it to ascend when filled with gas where it will impact the turbine impeller when ascending where then the gas is removed causing the buoyant device to descend again impacting the turbine and cyclically repeating the process continuously thereby generating electricity.

A further object of the present invention is to provide a buoyant energy engine wherein said housing provides a structure including a pair of column-like compartments having an oil source and pump for moving the oil from one compartment to the other where one column contains water causing the released oil to ascend to the top of the compartment where the oil then moves into the second air filled compartment having a turbine impeller within where gravity causes the oil to act as the motive force for turning the impeller and cyclically repeating the process continuously thereby generating electricity.

A yet further object of the present invention is to provide a buoyant energy engine providing a means within a fluid containing a turbine having an impeller and including an air pump in communication with an external air source that is pumped below the turbine impeller and released to engage the same causing rotation of the turbine impeller thereby generating electricity.

A still yet further object of the present invention is to provide a buoyancy device having housing incorporating a propulsion compartment, an explosives compartment, an air filled compartment, a video cam, guidance controls, transceiver and impact trigger thereby forming a missile buoyancy device.

Additional objects of the present invention will appear as the description proceeds.

The present invention overcomes the shortcomings of the prior art by providing buoyant energy technology utilizing buoyant materials that can be incorporated into other electrically driven devices as a power source and as a component of a guided explosive device within a liquid medium.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 buoyant engine
12 energy sphere
14 bottom air lock
16 tall water filled tower
18 top air lock
20 air filled tower
22 turbine
24 flushing and filling valve
30 gas driven engine
32 gas injection pump
34 gas injection line
36 balloon, filled
38 balloon, emptying
40 balloon, empty
42 gas balloon powered turbine
44 gas drain line
50 liquid driven engine
52 rising oil or other (lighter than H$_2$O liquid)
54 liquid driven engine water filled tower
56 top tank
58 falling (lighter than H$_2$O) liquid
60 liquid driven engine turbine blade
62 liquid driven engine turbine
64 liquid engine air filled tower
66 bottom tank
68 oil or lighter than H$_2$O liquid pump
69 drain switch
70 air stream driven engine
72 snorkel tube
74 air pump
76 air stream driven engine turbine
78 optional air supply
80 missile/torpedo
82 enemy ship/target
84 user/controller
86 control interface
88 missile/torpedo deploying vessel
90 ram contact tip
92 primer rod
94 primer
96 payload
98 missile/torpedo upper portion
100 video and guidance control packages
102 propulsion and power units
104 directional control fins
110 spherical buoyant missile
112 generally spherical air chamber
A1 buoyancy directional arrow
A2 gravity impulse directional arrow
A3 turbine directional arrow
A4 rising balloon directional arrow
A5 gas balloon powered turbine directional arrow
A6 rising liquid directional arrow
A7 falling liquid directional arrow
A8 liquid driven engine turbine directional arrow
A9 rising air stream directional arrow
A10 primer rod contact directional arrow
X contact point
T gas tank
W water

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Figure 1:
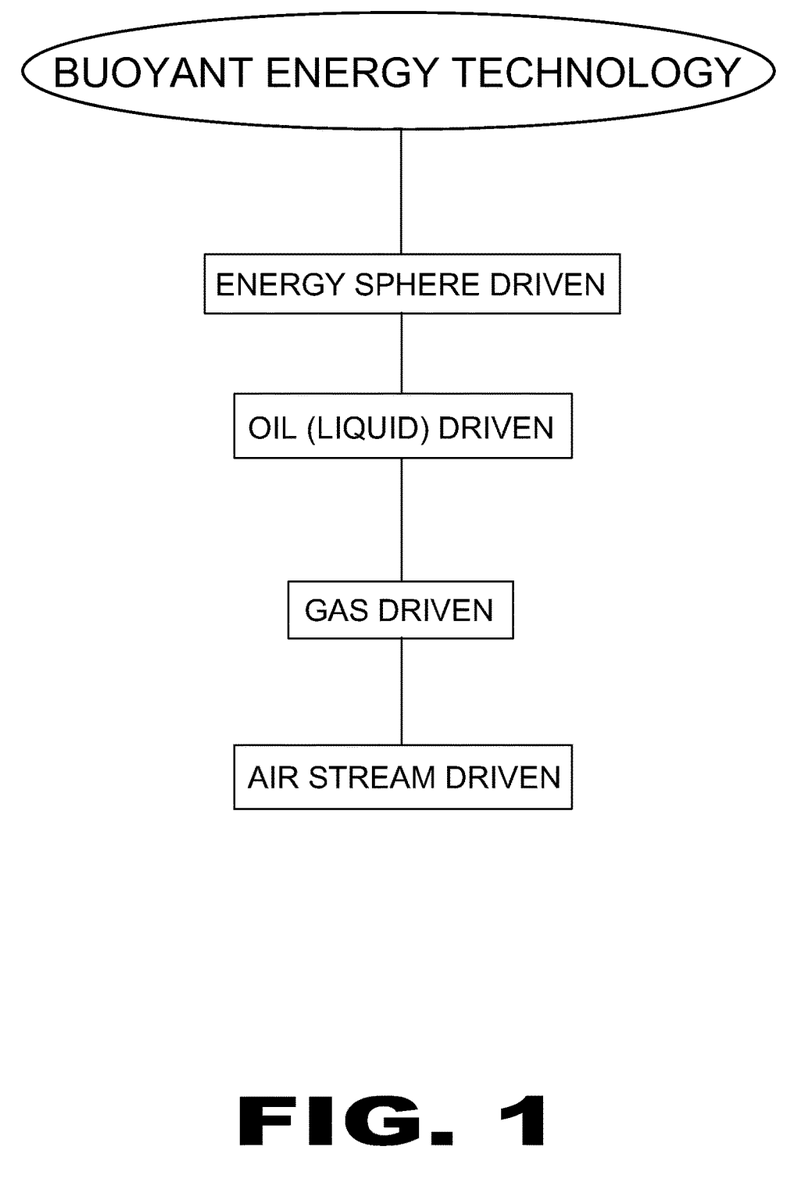
FIG. 1 is a flow chart of the buoyant energy technology used to generate electricity.

Referring to FIG. 1, shown is a flow chart of the buoyant energy technology used to generate electricity. The present invention is buoyant energy technology utilizing buoyant materials (solid, liquid, gas) that is used to power devices producing electricity. The device provides a buoyant cyclical engine for generating electricity that can be incorporated into other electrically driven devices as a power source. It is further envisioned by the present invention that the buoyant cyclical engine may include energy storage devices, such as batteries so that when the electrically driven device is not being used, the buoyant engine can continue to generate electricity that is stored until needed.

Figure 2:
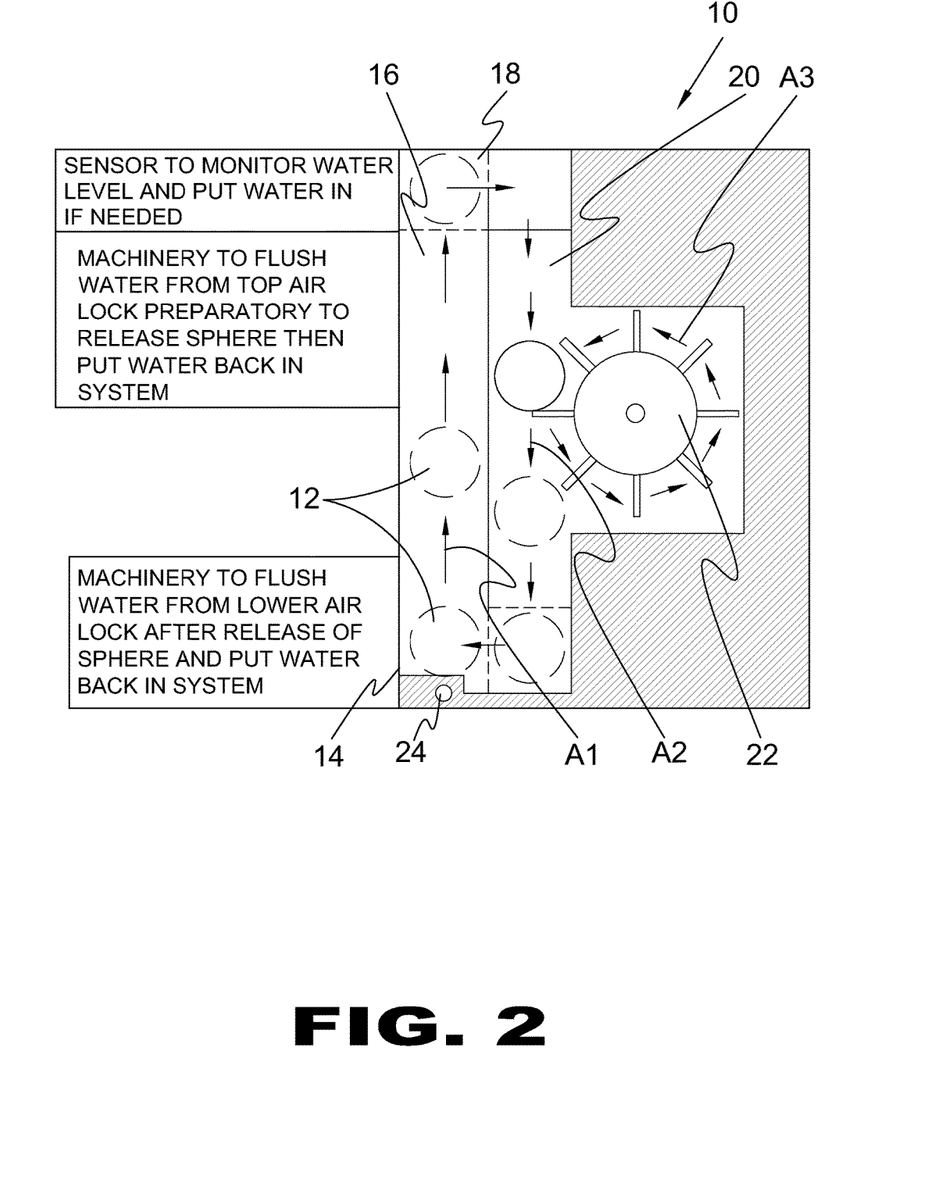
FIG. 2 is an illustrative view of the buoyant engine of the present invention.

Referring to FIG. 2, shown is an illustrative view of the buoyant engine 10 of the present invention. Shown is the preferred ramification of the present invention, a specially designed energy sphere 12 (metal and hollow, providing buoyancy) is released from a bottom air lock 14 into a tall water filled tower 16. Because of its buoyancy it floats to the top as indicated by buoyancy directional arrow A1 in the Figure, achieving an energy potential. It is transferred through another top air lock 18 and is then released into an air filled tower 20 which contains a turbine 22 and serves, in this instance, as a turbine engagement and activation area as will be detailed further below. As gravity pulls the energy sphere 12 down, as indicated by gravity impulse directional arrow A2, it turns the turbine 22 (indicated by turbine directional arrow A3), generating electricity. At the bottom it goes back into the bottom air lock 14 (which has been flushed of water gained when it was opened by CO2 gas or other technique through flushing and filling valve, indicated at 24) to be released again. Flushing and filling valve 24 also serves to refill the tall water filled tower 16. The energy sphere 12 thus keeps cycling around generating electricity.

Figure 3:
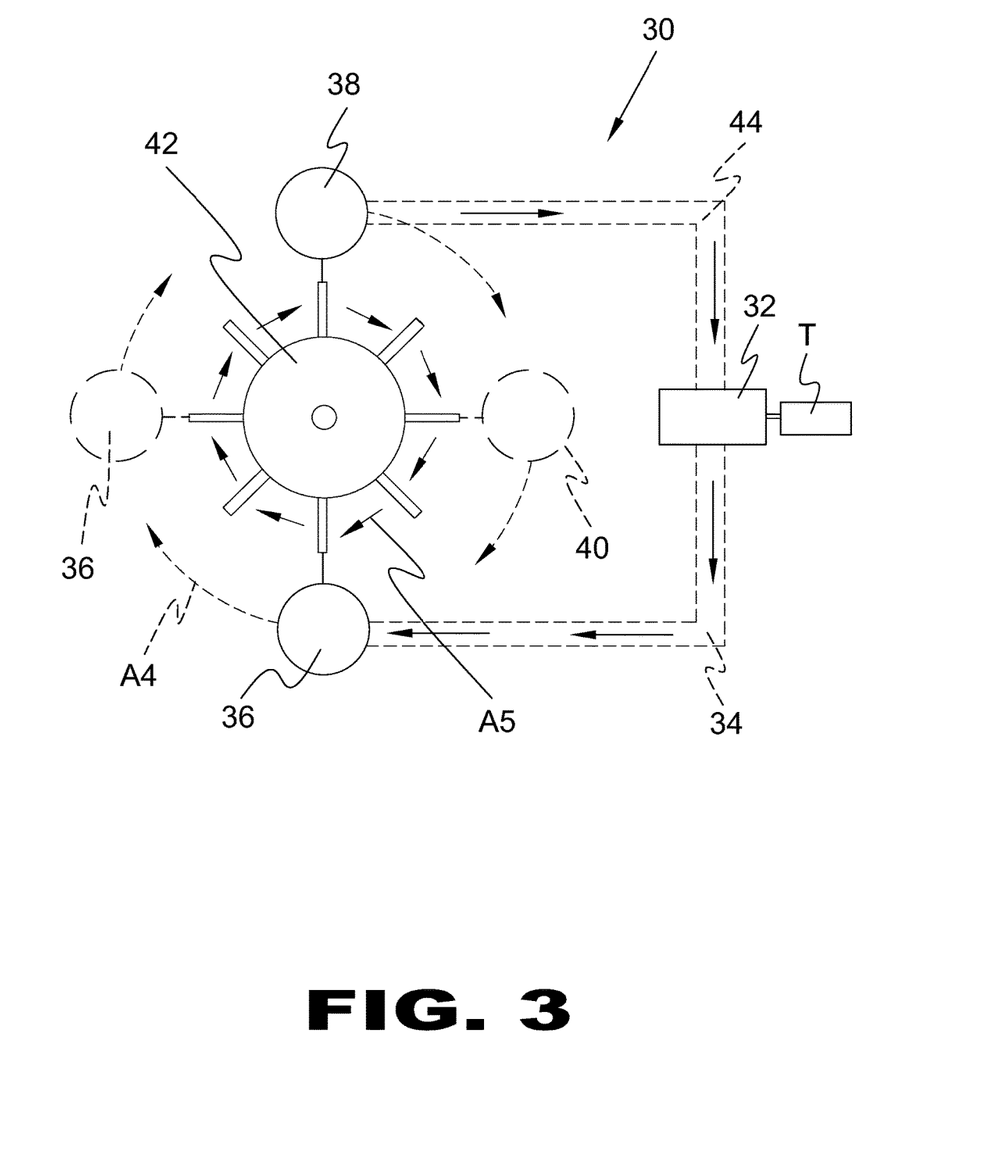
Referring to FIG. 3 is an illustrative view of the present invention in use.

Referring to FIG. 3, shown is an illustrative view of another embodiment of the present invention in use. Shown is a gas driven system of the present invention indicated at 30. Gas contained in a reservoir or tank T is injected by means of a pump 32 through gas injection line 34 into a balloon 36 attached to gas balloon powered turbine 42. The filled balloon (indicated in the Figure at 36) rises, as shown by directional arrow A4 turning (shown by arrow A5) the gas balloon powered turbine 42 generating electricity. This, as above, serves as a turbine activation and engagement area. At the top, the balloon 38 is drained of gas, and the gas is recycled through the gas drain line 44 to pump 32 and thus by means of gas injection line 34 into the bottom balloon 36 which then rises while the emptied balloon 40 returns to the bottom.

Figure 4:
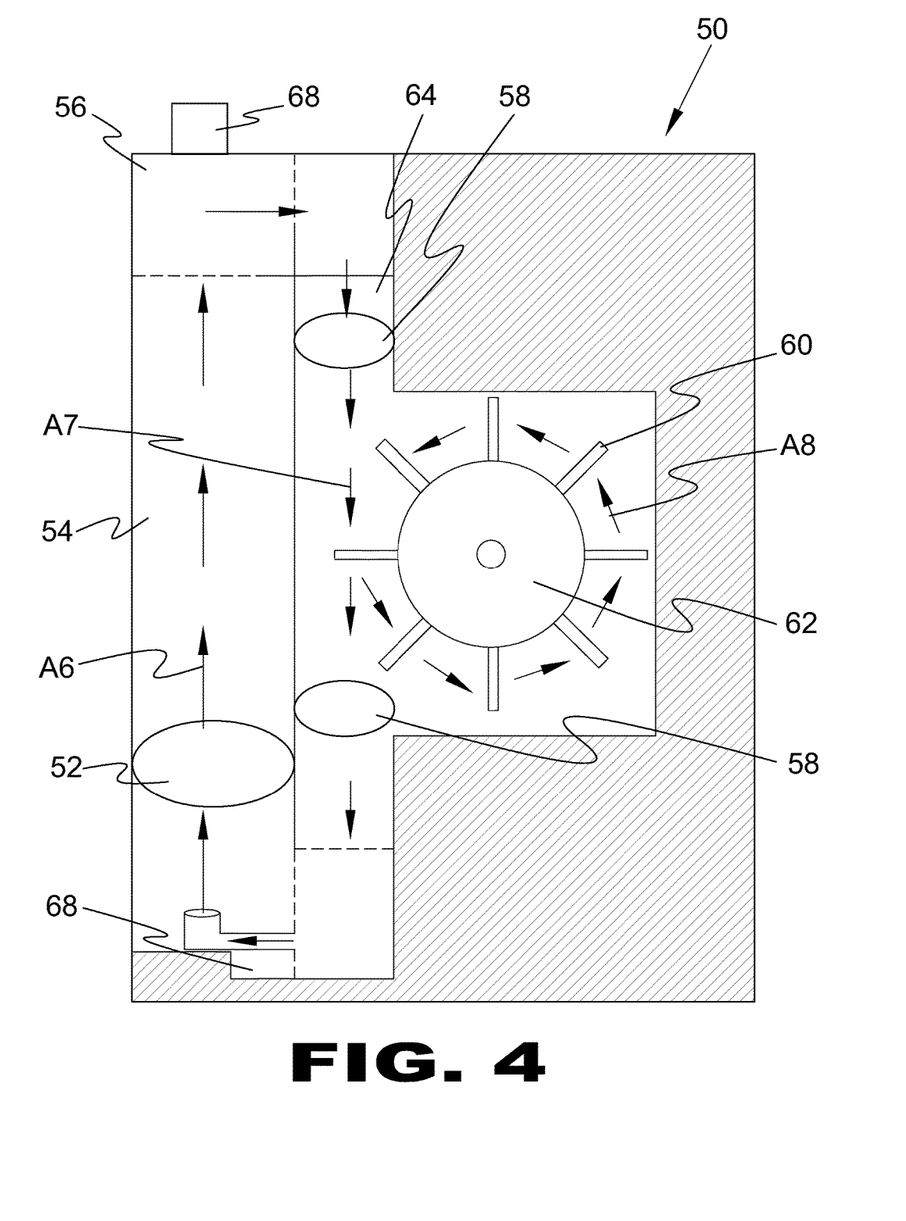
FIG. 4 is an illustrative view of the present invention in use.

Referring to FIG. 4, shown is an illustrative view of yet another embodiment of the present invention in use. Shown is the liquid driven system 50 of the present invention. Oil 52 or some other liquid lighter than water (but as heavy as feasible) is released into a tall water filled tower 54. Its buoyancy causes it to rise to the top tank 56 (indicated by directional arrow A6), achieving an energy potential. It is drained from the tank 56 activated by drain switch 69 and is pulled by gravity and, while the lighter than water liquid 58 is falling through the liquid engine air filled tower 64, as seen in directional arrow A7, it affects the liquid driven engine turbine blade 60 in this embodiments turbine activation and engagement area, and thus drives the liquid driven engine turbine 62 (note directional arrow A8), generating electricity. At the bottom, the liquid is moved by means of an oil (or any lighter than water liquid contemplated) pump indicated at 68 into a bottom tank 66 to be released into the liquid driven engine water filled tower 54 again. It cycles around continuously generating electricity.

Figure 5:
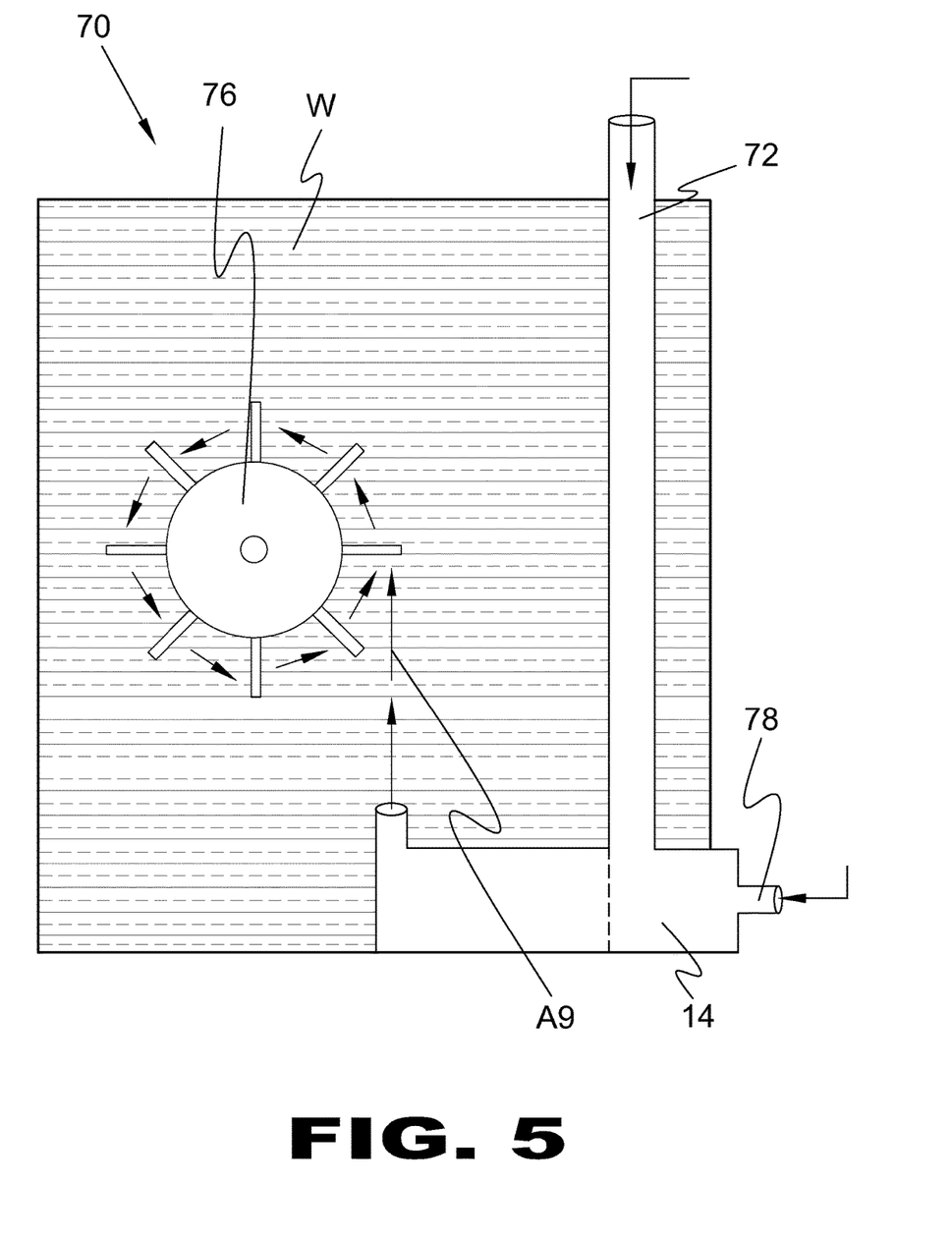
FIG. 5 is an illustrative view of the present invention in use.

Referring to FIG. 5, shown is an illustrative view of another novel embodiment of the present invention in use. Shown is the air stream driven engine 70 of the present invention. An underwater apparatus has a snorkel tube 72 for air supply. An air pump 74 provides a stream of air which because of its buoyancy rises (illustrated by directional arrow A9), through the ambient water W that, in this embodiment serves as the turbine activation and engagement area turning the air stream driven engine turbine 76 which generates electricity. An optional air supply, pressurized or otherwise, could also be utilized, as shown at 78. It should be noted that this embodiment of the invention could be used in either a movable (shipboard) or fixed shore establishment environment.

Figure 6:
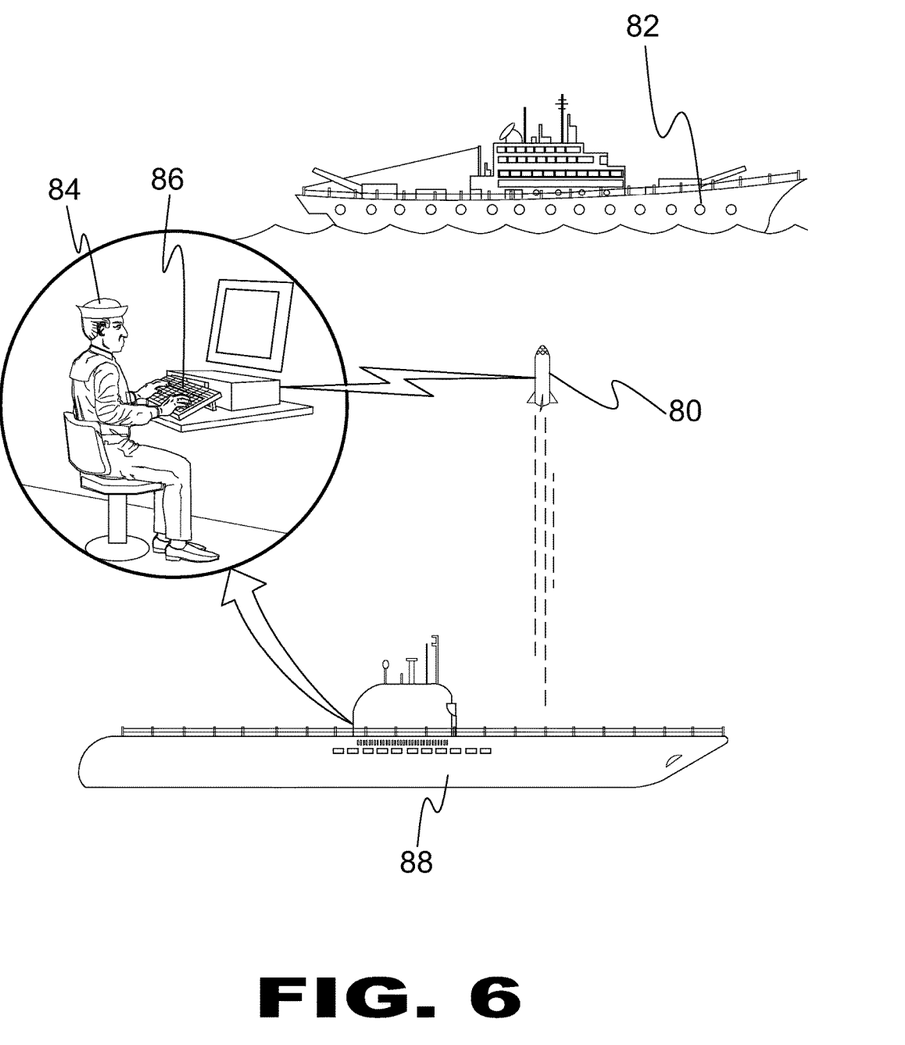
FIG. 6 is an illustrative view of the present invention in use.

Referring to FIG. 6, shown is an illustrative view of the present invention in use. The present invention is a missile/torpedo 80 containing enough air space (discussed further below) to make it highly buoyant when released and which can either can ram or deliver explosives or incendiaries to an enemy surface ship 82 (submarines, battleships, cruisers, any warfare vessels). The missile/torpedo 80 is controlled by a user 84 by means of a control interface 86 (seen here as a laptop computer) located on the missile/torpedo deploying vessel 88. The deploying vessel shown here is a submarine but other types of warships could be adapted to deploy the missile/torpedo 80. Additionally, the missile/torpedo 80 could be deployed in a similar manner as to a mine wherein it is attached to the bottom of the sea and deployed automatically through on-board sensors, or remotely.

Figure 7:
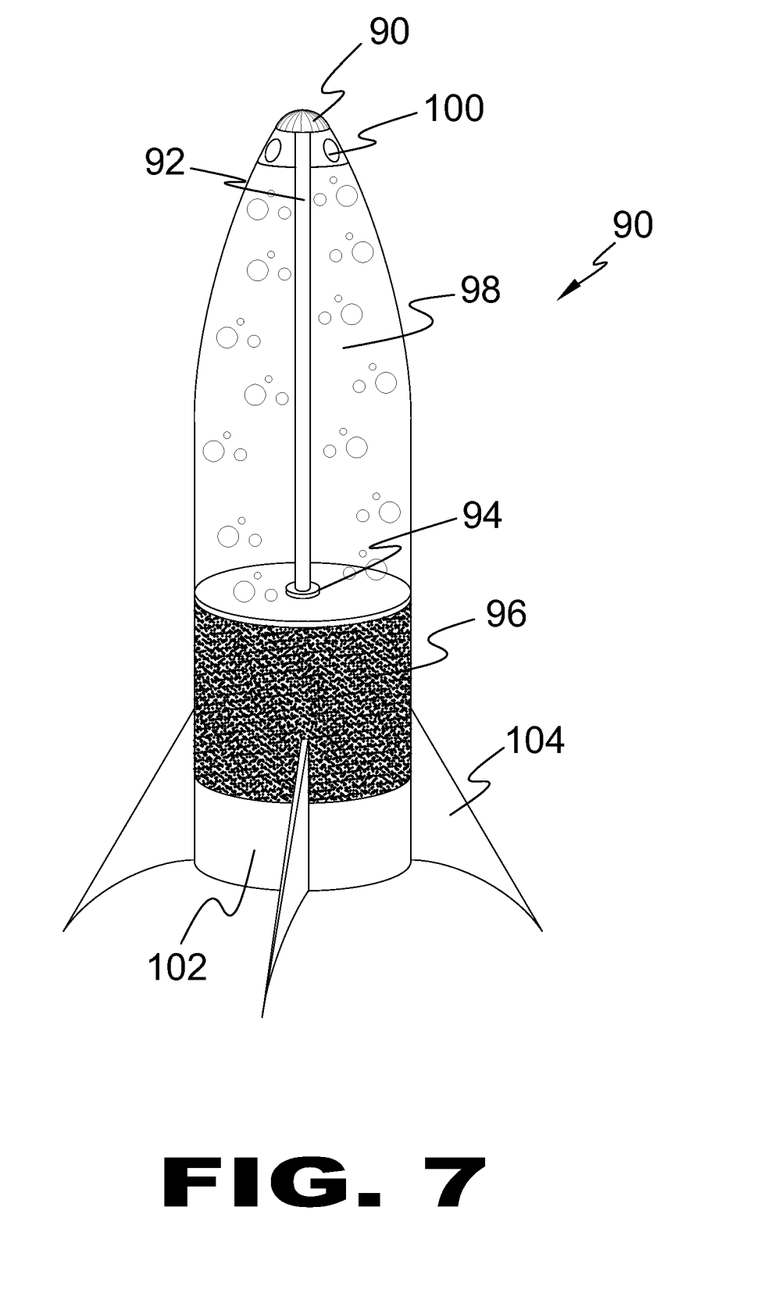
FIG. 7 is a perspective view of the present invention.

Referring to FIG. 7, shown is a perspective view of the present invention, specifically the missile/torpedo seen in FIG. 6. Shown is the cylindrical highly buoyant missile 80 of the present invention having a ram contact tip 90 that when activated pushes a primer rod 92 into the primer 94, igniting the pay load indicated at 96. The upper portion 98 of the missile contains enough air to make it highly buoyant and assists in the ascension of the missile while video cam and guidance control packages 100 send back images to a computer or control interface, such as a laptop denoted at 86 in FIG. 6, enabling the user 84 to further pin point target and control propulsion through propulsion and power units 102 with directional control being provided by control fins 104. The propulsion and power units, along with the guidance control are desired to be driven by any of the types of engines described above in the preceding Figures.

Figure 8:
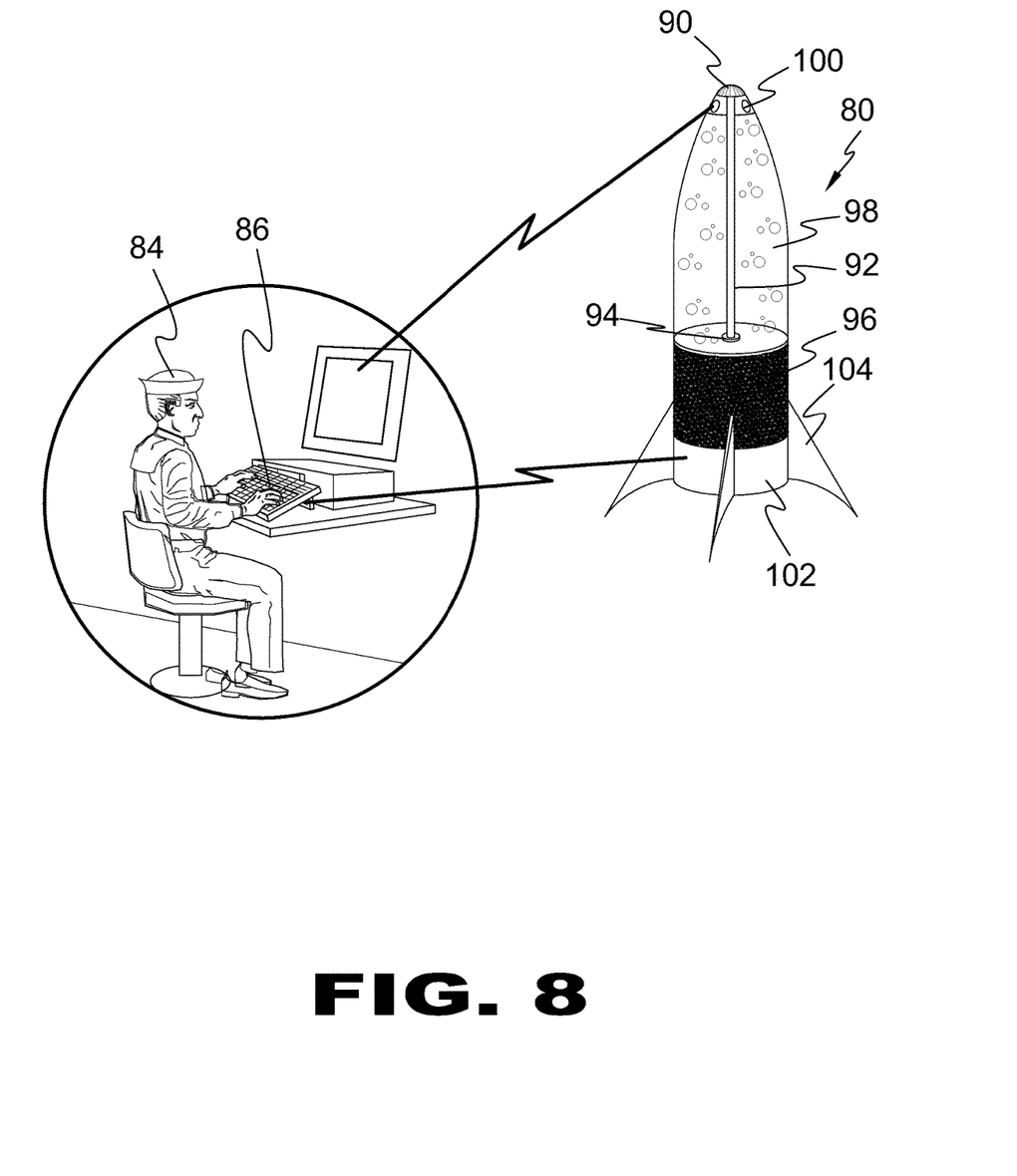
FIG. 8 is an illustrative view of the present invention.

Referring to FIG. 8, shown is another illustrative view of the present invention. The cylindrical highly buoyant missile/torpedo 80 of the present invention provides a ram contact tip 90 that when activated pushes a primer rod 92 into the primer 94, igniting the pay load 96. The upper portion 98 of the missile/torpedo 80 contains enough air to make it highly buoyant and assists in the ascension of the missile while video cam and guidance control 100 send back images to a laptop or control interface 86 to allow the user 84 user to pinpoint the target (shown as 82 in FIG. 6) and control propulsion and guidance through propulsion and power units 102 and aided with directional control fins 104.

Figure 9:
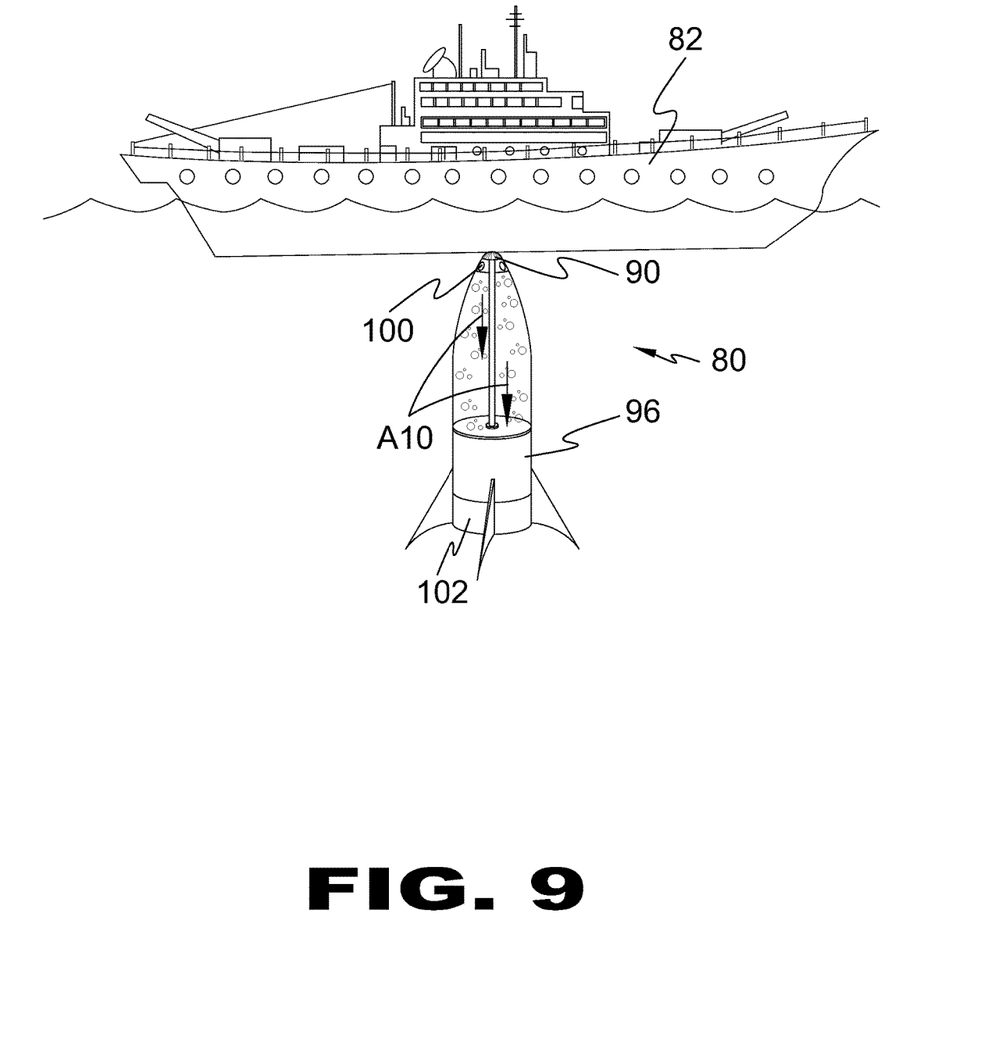
FIG. 9 is an illustrative view of the present invention in use.

Referring to FIG. 9, shown is an illustrative view of the present invention in use. When contact is made with the target 82, a ram contact tip 90 is activated, pushing a primer rod 92 into the primer 94 (as indicated by directional arrows A10), igniting the pay load 96. The upper portion 98 of the missile 80 contains enough air to make it highly buoyant and assists in the ascension of the missile 80 while video cam and guidance control 100 send back images to the control interface 86 and its user 84 to further pinpoint the target and to control propulsion.

Figure 10:
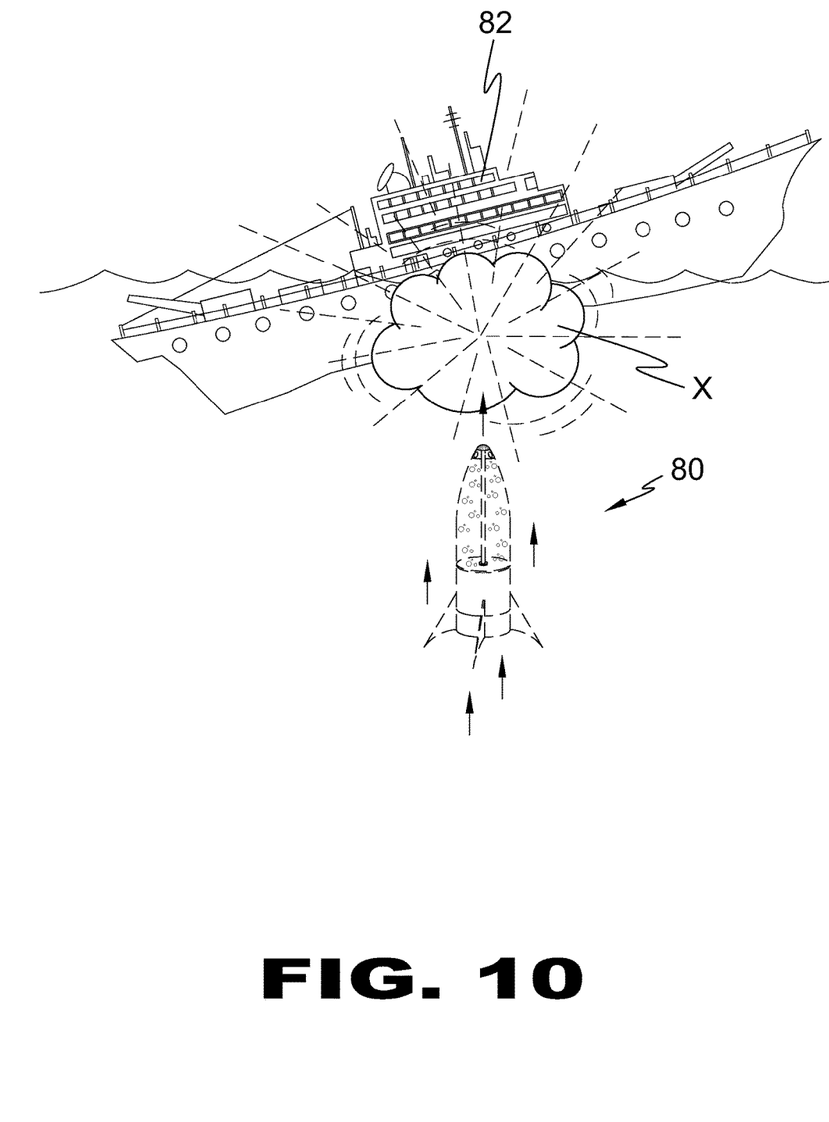
FIG. 10 is an illustrative view of the present invention.

Referring to FIG. 10, shown is an illustrative view of the present invention. When contact indicated at X is made, a ram contact tip 90 is activated, pushing a primer rod 92 into the primer 94, igniting the pay load 96. As mentioned above, the upper portion 98 of the missile/torpedo 80 contains enough air to make it highly buoyant and assists in the ascent of the device while video cam and guidance control packages 100 send back images or other data to the user 84 to further pinpoint the target 82 and control propulsion through power units 102 and direction through control fins 104.

Figure 11:
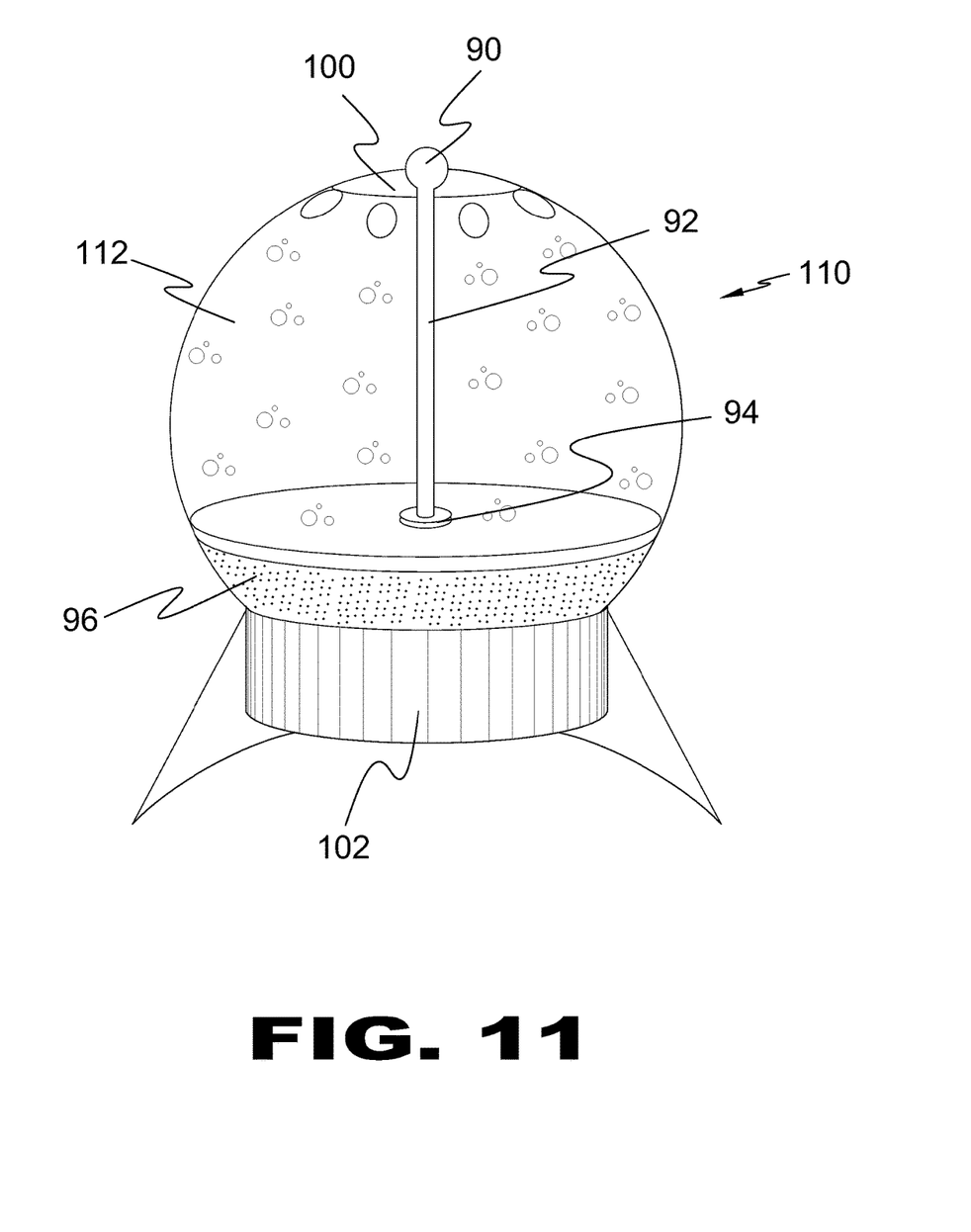
FIG. 11 is a perspective view of the present invention.

Referring to FIG. 11, shown is a perspective view of the present invention. Shown is the spherically shaped air buoyant missile 110 of the present invention providing the same components as the cylindrical missile with a generally spherical air chamber 112 sized to enable ascension of the device when deployed. As mentioned above, the present invention could be utilized in the same manner as an anchored mine, attached to the seabed, and it is contemplated that the unit could be powered in standby and/or sensing modes by any of the engines (buoyant sphere, differing liquid density, gas, or air stream type) detailed above.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A buoyant energy device, comprising:
   a turbine including turbine blades extending therefrom;
   a turbine activating engagement area, wherein said extended turbine blades are located in said turbine activating engagement area;
   a first ambient material substantially filling said turbine activating engagement area, said first ambient substance having a first specific gravity;
   a turbine activating means and an introduction means for introducing said turbine activating means into said turbine activating engagement area, and wherein said turbine activating means has a second specific gravity differing from said first specific gravity of said first ambient material;
   whereby
   said turbine activation means is introduced into said turbine activating engagement area and thereby passes therethrough because of the differing specific gravities of said first ambient material first specific gravity and said turbine activation means second specific gravity, thus engaging said extended turbine blades and thus creating energy from said turbine, and further including:

a tall water filled tower having a bottom air lock and a top air lock and where said turbine activation means comprises a hollow metal sphere and wherein said hollow metal sphere is released from said bottom air lock and rises through said tall water filled tower to be received by said top air lock; and, said introduction means comprises an exit from said top air lock and said turbine activation area comprises an air filled tower connected to said top air lock and wherein said hollow sphere is released into the top of said air filled tower and falls, engaging said extended turbine blades and wherein said bottom of said air filled tower communicates with said bottom air lock, so that said hollow sphere is cycled through said tall water filled tower and said air filled tower to produce energy from said turbine.

2. The buoyant energy device as claimed in claim further comprising a flushing and filling valve for said bottom air lock and said top air lock.

3. The buoyant energy device as claimed in claim 1, further comprising at least one of a missile apparatus and a torpedo apparatus attached thereto, said missile/torpedo apparatus further including an upper air filled portion, a video and guidance control package powered by said turbine, a ram contact tip, a primer rod connected to said ram contact tip, a primed activated by said primer rod and a payload activated by said primer, said payload being an explosive.

4. The buoyant energy device as claimed in claim 3, further comprising a flushing and filling valve for said bottom air lock and said top air lock.

5. The buoyant energy device as claimed in claim 1, further comprising at least one of a missile apparatus and a torpedo apparatus attached thereto, said at least one of said missile apparatus and said torpedo apparatus further including an upper air filled portion, a video and guidance control package powered by said turbine, a ram contact tip, a primer rod connected to said ram contact tip, a primed activated by said primer rod, and a payload activated by said primer, said payload being an incendiary.

6. The buoyant energy device as claimed in claim 5, further comprising a flushing and filling valve for said bottom air lock and said top air lock.

7. A buoyant energy device, comprising:
a turbine including turbine blades extending therefrom;
a turbine activating engagement area, wherein said extended turbine blades are located in said turbine activating engagement area;
a first ambient material substantially filling said turbine activating engagement area, said first ambient substance having a first specific gravity;
a turbine activating means and an introduction means for introducing said turbine activating means into said turbine activating engagement area, and wherein said turbine activating means has a second specific gravity differing from said first specific gravity of said first ambient material; whereby,
said turbine activation means is introduced into said turbine activating engagement area and thereby passes therethrough because of the differing specific gravities of said first ambient material first specific gravity and said turbine activation means second specific gravity, thus engaging said extended turbine blades and thus creating energy from said turbine, and further including:
a tall water filled tower including a top tank and a drain switch and wherein said turbine activation means comprises a quantity of oil released into said water filled tower such that said quantity of oil rises to said top tank and wherein said introduction means comprises said drain switch and wherein said turbine activation area comprises an air filled tower connect to said top tank such that when said drain switch is activated, said quantity of oil falls through said air filled tower, engaging said extended turbine blades and, thus, produces energy from said turbine.

8. The buoyant energy device as claimed in claim 7, further comprising at least one of a missile apparatus and a torpedo apparatus attached thereto, said at least one of said missile apparatus and said torpedo apparatus further including an upper air filled portion, a video and guidance control package powered by said turbine, a ram contact tip, a primer rod connected to said ram contact tip, a primed activated by said primer rod, and a payload activated by said primer, said payload being an explosive.

9. The buoyant energy device as claimed in claim 7, further comprising at least one of a missile apparatus and a torpedo apparatus attached thereto, said at least one of said missile apparatus and said torpedo apparatus further including an upper air filled portion, a video and guidance control package powered by said turbine, a ram contact tip, a primer rod connected to said ram contact tip, and primed activated by said primer rod, and a payload activated by said primer, said payload being an incendiary.

10. The buoyant energy device as claimed in claim 7, where said turbine activation area comprises ambient water and where said turbine activation means comprises air, and where said introduction means for introducing said air into said turbine activation means comprises an air pump.

11. The buoyant energy device as claimed in claim 1, where said turbine activation area comprises ambient water and where said turbine activation means comprises air, and where said introduction means for introducing said air into said turbine activation means comprises an air pump.

* * * * *